(12) United States Patent
Kawanishi et al.

(10) Patent No.: US 11,476,645 B2
(45) Date of Patent: Oct. 18, 2022

(54) BUS BAR CONNECTING DEVICE, SWITCHGEAR, AND METHOD FOR CONNECTING A BUS BAR CONNECTING DEVICE

(71) Applicant: Mitsubishi Electric Corporation, Tokyo (JP)

(72) Inventors: Katsunori Kawanishi, Tokyo (JP); Saroj Paudel, Tokyo (JP); Naoaki Inoue, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 13 days.

(21) Appl. No.: 17/285,927

(22) PCT Filed: Dec. 6, 2018

(86) PCT No.: PCT/JP2018/044823
§ 371 (c)(1),
(2) Date: Apr. 16, 2021

(87) PCT Pub. No.: WO2020/115849
PCT Pub. Date: Jun. 11, 2020

(65) Prior Publication Data
US 2021/0376577 A1  Dec. 2, 2021

(51) Int. Cl.
*H02B 13/00* (2006.01)
*H02B 13/045* (2006.01)
(Continued)

(52) U.S. Cl.
CPC ............. *H02B 1/20* (2013.01); *H02B 13/005* (2013.01); *H02B 13/045* (2013.01); *H02G 5/06* (2013.01)

(58) Field of Classification Search
CPC .................................................. H02B 13/005
See application file for complete search history.

(56) References Cited

U.S. PATENT DOCUMENTS 6,271,467 B1 * 8/2001 Book .................... H02B 13/005
439/535
7,775,818 B2 * 8/2010 Listl ..................... H02B 13/045
439/212
(Continued)

FOREIGN PATENT DOCUMENTS

DE         1922433 A1 * 11/1970  ........... H02B 13/005
EP         0999623 A1 * 10/2000  ........... H02B 13/005
(Continued)

OTHER PUBLICATIONS

International Search Report (PCT/ISA/210) with translation and Written Opinion (PCT/ISA/237) dated Feb. 26, 2019, by the Japan Patent Office as the International Searching Authority for International Application No. PCT/JP2018/044823. (11 pages).

*Primary Examiner* — Robert J Hoffberg
(74) *Attorney, Agent, or Firm* — Buchanan Ingersoll & Rooney PC (57) ABSTRACT

A bus bar connecting device having a first bushing which has a first protruding part projecting to the outside of the first pressure vessel 4 and a first connection part, a second bushing which has a second protruding part projecting to the outside of the second pressure vessel and a second connection part, a connecting conductor part that electrically connects the first connection part and the second connection part, and an intermediate tank having a hand hole and a lid for sealing, wherein the intermediate tank stores the first protruding part and the second protruding part in an own internal space so as to seal the stored parts, thereby the bus bar connecting device that has good switchgear assembly and can improve a line unit workability is provided.

20 Claims, 9 Drawing Sheets

(51) Int. Cl.
 *H02B 1/20* (2006.01)
 *H02G 5/06* (2006.01)

(56) References Cited

U.S. PATENT DOCUMENTS

| | | | |
|---|---|---|---|
| 9,197,046 B2 * | 11/2015 | Rautenberg | ........... H02G 3/0462 |
| 9,906,008 B2 * | 2/2018 | Yoshida | ................. H02G 5/007 |
| 2016/0294174 A1 | 10/2016 | Yoshida et al. | |

FOREIGN PATENT DOCUMENTS

| | | | | |
|---|---|---|---|---|
| FR | 2625025 A1 * | 6/1983 | ........... | H02B 13/005 |
| JP | S5829818 U | 2/1983 | | |
| JP | S6073309 U | 5/1985 | | |
| JP | S62213504 A | 9/1987 | | |
| JP | S6393723 U | 6/1988 | | |
| JP | H06327111 A | 11/1994 | | |
| JP | 2000059930 A * | 2/2000 | ........... | H02B 13/005 |
| JP | 2007104753 A | 4/2007 | | |
| JP | 2015053793 A | 3/2015 | | |
| WO | 2015076029 A1 | 5/2015 | | |

* cited by examiner

Cross-section
B-B

# BUS BAR CONNECTING DEVICE, SWITCHGEAR, AND METHOD FOR CONNECTING A BUS BAR CONNECTING DEVICE

TECHNICAL FIELD

The present application relates to a bus bar connecting device used in the main circuit part of a gas insulated switchgear used in a power receiving and transforming system, a switchgear, and a method for connecting a bus bar connecting device.

BACKGROUND ART

The switchgear used in a power receiving and transforming system (hereinafter referred to as "switchgear") is supplied with high-voltage current from the outside via cables, and in general, the structure consists of multiple switchgear units installed in parallel in a line unit. In the connection between each switchgear at the installation site, the protruding part of the insulating bushing pre-attached to the inner wall surface of the pressure vessel in each adjacent switchgear single unit projects to the outside of the pressure vessel, the bushings are configured to face each other, and the end faces of the protruding part of the bushing is electrically connected via an uneven connecting member. It is well known that the protruding part of the bushings configured at the opposite and the perimeter of the connection members are surrounded by an solid insulating adapter, and that the bus bar connecting device satisfies the electrical connection performance. (For example, see Patent Literature 1)

PRIOR ART DOCUMENT

Patent Literature

[Patent Literature1] WO2015/076029 A1

DISCLOSURE OF INVENTION

Technical Problem

As the bus bar connecting device described in Patent Literature 1 is a solid insulated bus bar type that uses a solid insulating adapter, the advantage of the bus bar connecting device described in Patent Literature 1 is that it does not require gas treatment when the switchgear is lined up, but as the connection part cannot be adjusted after the bus bar is connected, it is necessary to accurately match the axes of the two bushings that are arranged so as to face each other when lined up. In other words, if the axes of the bushings are not accurately aligned with each other, there is a risk that the connection component cannot be installed or that the surface pressure applied to the bushing by the solid insulating adapter becomes small, resulting in deterioration of insulation performance. Therefore, in order to match the axes of the bushings arranged to face each other in advance, it is necessary to adjust them accurately during the assembly stage into a single switchgear. However, when the position of the bushing is high, the axis must be matched, which is also a time-consuming problem in assembly. In addition, depending on the positional accuracy of the pre-installed bushing, there is a possibility that the bus bar connection may not be possible, and in this case, a big rework is required.

The present application has been made to solve the above-mentioned problems, and it is an object of the present application to provide a bus bar connecting device, a switchgear, and a method for connecting a bus bar connecting device, which can improve the assembleability of the switchgear and the workability of the line unit.

Solution to Problem

The present application provides a bus bar connecting device, having:

a first bushing fixed to an inner wall surface of a first pressure vessel and penetrated inside own by a first internal through conductor, comprising;

a first protruding part projecting to the outside of the first pressure vessel, and a first connection part exposed from the first protruding part, a second bushing fixed to an inner wall surface of a second pressure vessel adjacent to the first pressure vessel and penetrated inside own by a second internal through conductor, comprising;

a second protruding part projecting to the outside of the second pressure vessel, and a second connection part exposed from the second protruding part, a connecting conductor part made of a conductive member that electrically connects the first connection part and the second connection part and provided between the first bushing and the second bushing, and An intermediate tank comprising;

a hand hole having an opening sized to include a vertical projection of the connecting conductor part, and lid for sealing the hand hole, wherein;

the intermediate tank stores the first protruding part, the second protruding part, and the connecting conductor part in an own internal space so as to seal the stored parts.

Further, both ends of the intermediate tank of the bus bar connecting device according to the present application are provided in an annular shape along the peripheral edges of the first fringe area and the second fringe area, respectively, as a space for passing a fixture fixed to the outer wall surface of the first pressure vessel and the second pressure vessel, the intermediate tank has a bent part that bends inward toward the bushing.

In the switchgear using the bus bar connecting device according to the present application, a through hole penetrating the wall surface of the pressure vessel is provided on the wall surface of the pressure vessel covered by the opening of the intermediate tank of the bus connection device, the intermediate tank and the pressure vessel are in the same gas compartment.

In the method for connecting the bus bar connecting device according to the present application, a step for projecting the other end of the first bushing from the bushing opening of the first pressure vessel to the outside where one end of the first bushing is fixed to the inner wall surface of the first pressure vessel, a step for projecting the other end of the second bushing from the bushing opening of the second pressure vessel to the outside where one end of the second bushing is fixed to the inner wall surface of the second pressure vessel adjacent to the first pressure vessel to face the first bushing, a step for fixing the second outer edge part of the intermediate tank to the outer wall surface of the second pressure vessel corresponding to the mounting position of the second bushing where the first outer edge part of the intermediate tank is fixed to the outer wall surface of the first pressure vessel corresponding to the mounting position of the first bushing, a step for connecting a connecting conductor part between the first bushing and the second bushing from a hand hole provided in the intermediate tank, and a step, after the connection work is completed, for sealing the hand hole with a lid and then filling an insulating gas in the internal space of the intermediate tank, are comprised.

Advantageous Effects of Invention

According to the bus bar connecting device according to the present application, the bus bar connecting device can be easily assembled and the workability of the switchgear line unit can be improved. In addition, the structure of the intermediate tank makes possible the reduction of the size of the bus bar connecting device.

Further, according to the switchgear according to the present application, the number of gas treatments in the pressure vessel of the switchgear and the intermediate tank of the bus bar connecting device can be reduced. Further, with the miniaturization of the bus bar connecting device, the external size of the switchgear can be made compact.

Further, according to the method for connecting a bus bar according to the present application, the bus connection work can be performed from the hand hole of the intermediate tank, so that the assembly work is simplified. Moreover, since the contact resistance can be minimized by improving the bus connection performance, the main circuit resistance between the switchgears can also be reduced.

DESCRIPTION OF EMBODIMENTS

Hereinafter, the first embodiment of the present application will be described with reference to the drawings.

First Embodiment

Figure 1:
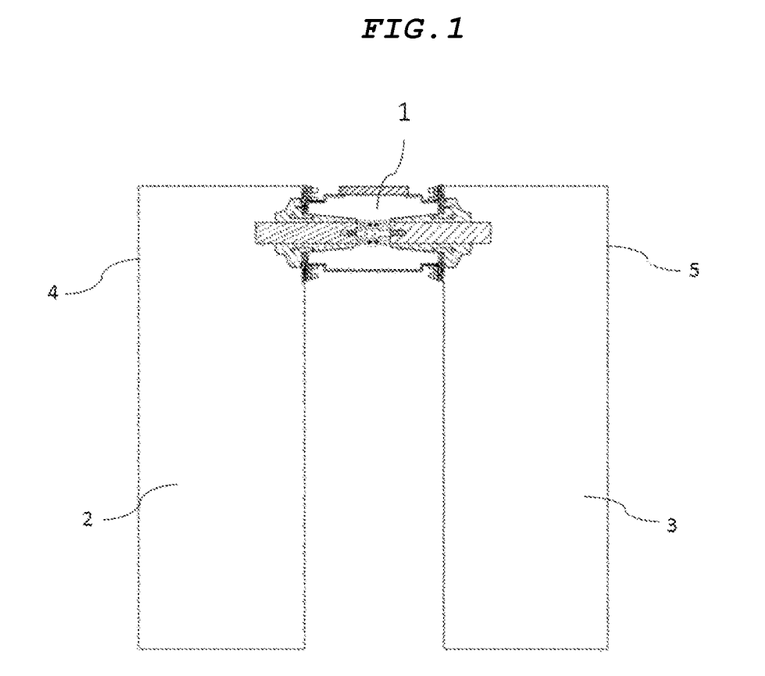
FIG. 1 is a diagram showing an entire switchgear connected to a bus bar connecting device according to the first embodiment of the present application.

FIG. 1 shows a switchgear connected to a bus bar connecting device according to the first embodiment of the present application. In FIG. 1, the switchgear 2 and the switchgear 3, which are single switchgears, ensure the insulation inside the pressure vessel by filling the first pressure vessel 4 and the second pressure vessel 5 with insulating gas, respectively. The bus bar connecting device 1 is arranged above the connection area between the switchgear 2 and the pressure vessel of the switchgear 3. In this way, the adjacent switchgears are connected to each other via a bus bar connecting device, and a plurality of adjacent switchgears are configured in parallel (in the left-right direction in FIG. 1) to form a switchgear for a power receiving and distribution system.

Figure 2:
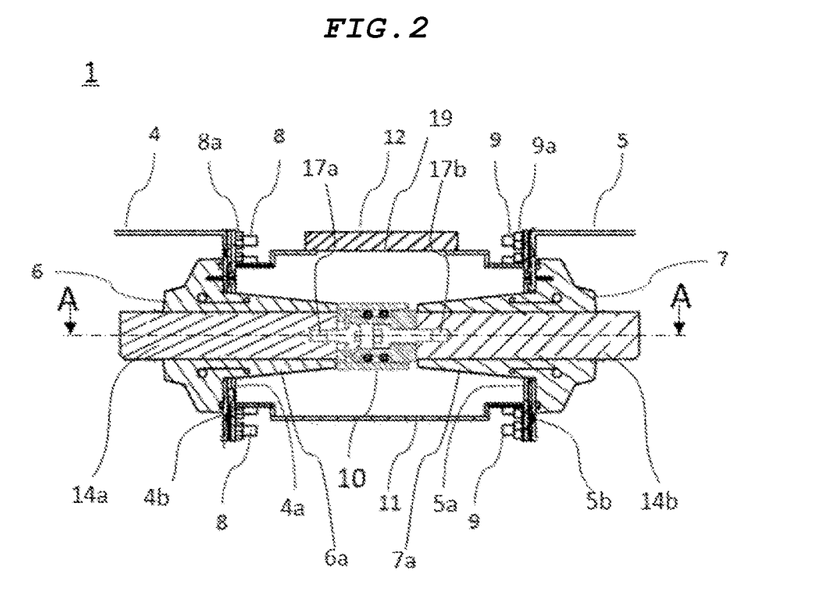
FIG. 2 is an enlarged cross-sectional view of a bus bar connecting device according to the first embodiment of the present application.
Figure 3:
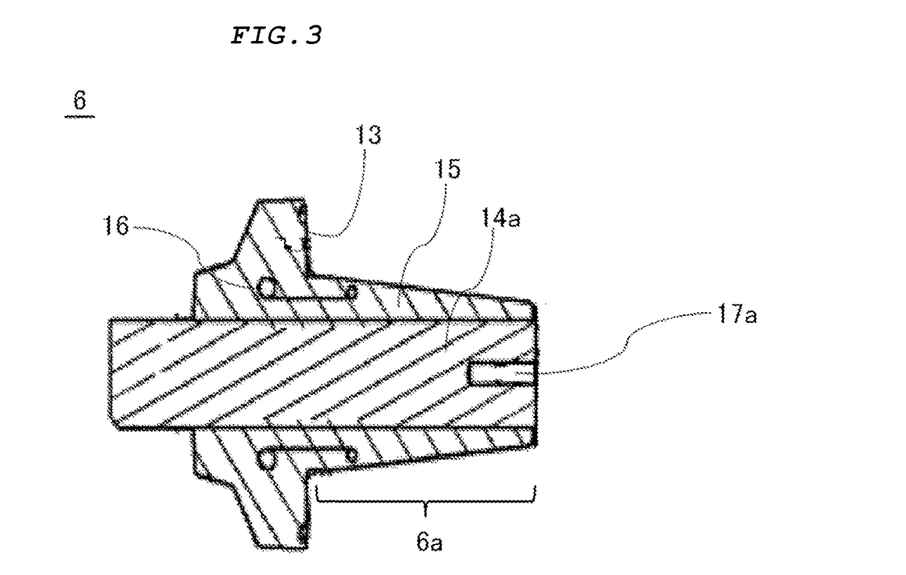
FIG. 3 is an enlarged cross-sectional view of a bushing of the bus bar connecting device according to the present application.
Figure 4:
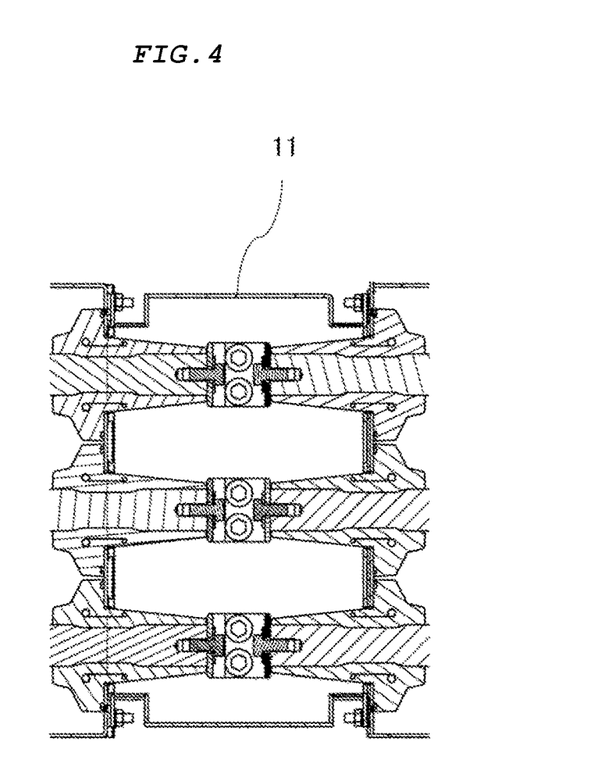
FIG. 4 is a cross-sectional view seen from above of the bus bar connecting device according to the first embodiment of the present application.
Figure 5A:
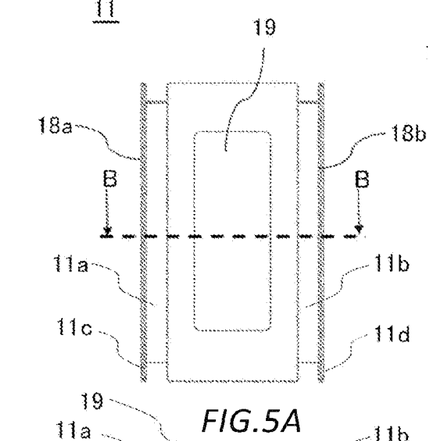
FIG. 5A is a drawing of an intermediate tank of the bus bar connecting device according to the present application and shows the structure seen from the upper part of the intermediate tank.
Figure 5B:
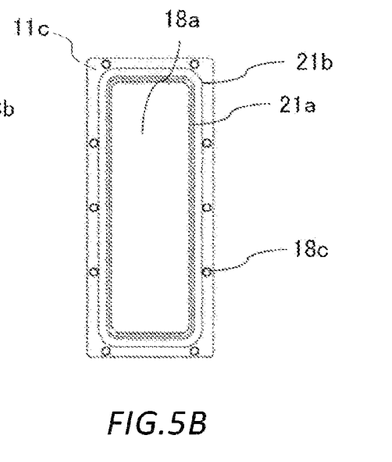
FIG. 5B shows the structure of the first fringe area, which is one end surface of the intermediate tank fixed to the first pressure vessel of the switchgear.
Figure 5C:
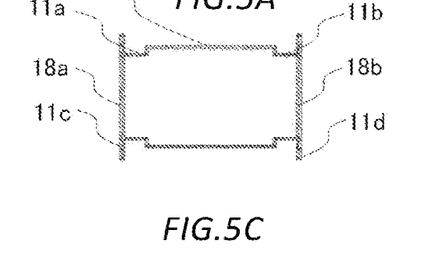
FIG. 5C shows a cross section B-B in FIG. 5A.

FIG. 2 is an enlarged view of a bus bar connecting device according to the first embodiment of the present application. FIG. 3 shows a cross-sectional structure of the bushing according to the first embodiment of the present application. FIG. 4 is a cross-sectional view seen from above of the bus bar connecting device according to the first embodiment of the present application. FIGS. 5A, 5B, and 5C are drawings of an intermediate tank of the bus bar connecting device according to the present application.

In FIG. 2, the first bushing 6 attached to the inner wall surface 4b of the first pressure vessel 4 of the switchgear 2 and the second bushing 7 attached to the inner wall surface 5b of the second pressure vessel 5 of the switchgear 3 are protruding outward from the bushing openings of the first pressure vessel 4 and the second pressure vessel 5, respectively, and they are arranged so as to be on a coaxial extension line. Further, the first connection part 17a exposed from the first protruding part 6a of the first bushing 6 and the second connection part 17b exposed from the second protruding part 7a of the second bushing 7 are electrically connected via a connecting conductor part 10 composed of a plurality of conductive members, and become a pair of bushing sets.

The cross-sectional structure of the bushing will be described by taking the first bushing 6 as an example, with reference to FIG. 3. The first bushing 6 has a bushing attachment surface 13 for fixing to the inner wall surface 4b of the first pressure vessel 4 at one end, and a first protruding part 6a protruding outward from the bushing opening on the wall surface of the first pressure vessel 4 at the other end, and is formed of a first internal through conductor 14a that penetrates the inside of the bushing insulating layer 15 made of a resin such as epoxy to insulate. The first internal through conductor 14a becomes the first connection part 17a at one end exposed from the first protruding part 6a. Further, inside the bushing insulating layer 15 at the opening position of the wall surface of the first pressure vessel 4, a constant distance from the first inner through conductor 14a is maintained on the outer periphery of the first inner through conductor 14a, and a tubular electric field relaxation shield 16 made of a copper net or a conductive plastic is embedded. The second bushing 7 has the same structure as the first bushing 6. The second bushing 7 has a structure where it is fixed to the inner wall surface 5b of the adjacent second pressure vessel 5 and to the inner wall surface 5b, and a second connection part 17b consisting of a second protruding part 7a projecting to the outside of the second pressure vessel 5 and one end of a second internal through conductor 14b (shown in FIG. 2) penetrating the inside exposed from the second protruding part 7a. The second bushing 7 is also provided with an electric field relaxation shield.

The description of the bus bar connecting device 1 will be done again with reference to FIG. 2. As shown in FIG. 2, in the connection area between the first pressure vessel 4 and the second pressure vessel 5, the intermediate tank 11 is installed so as the entire first protruding part 6a, the second protruding part 7a, and the connection conductor part 10 are stored in the internal space.
Both end faces of the intermediate tank 11 are fixed to the outer wall surfaces of the first pressure vessel 4 and the second pressure vessel 5, respectively. A plurality of fixtures 8 are attached to the outer wall surface 4a corresponding to the inner wall surface 4b part of the first pressure vessel 4 to which the first bushing 6 is attached, a plurality of fixtures 9 are attached as fixtures to the outer wall surface 5a corresponding to the inner wall surface 5b part of the second pressure vessel 5 to which the second bushing 7 is attached. In the intermediate tank 11, the first fringe area 11c (shown in FIGS. 5A, 5B, and 5C), which is one end surface is fixed to the outer wall surface 4a of the first pressure vessel 4 by the fixture 8 and the fixing nut 8a, the second fringe area 11d (shown in FIGS. 5A, 5B, and 5C), which is the other end surface, is fixed to the outer wall surface 5a of the second pressure vessel 5 by the fixture 9 and the fixing nut 9a.

Further, a hand hole 19 for connecting the connecting conductor part 10 is provided on a surface other than both end surfaces of the intermediate tank 11. As shown in FIG. 2, for example, a hand hole 19 and a lid 12 for sealing the hand hole 19 are provided on the upper surface of the intermediate tank 11. Further, by attaching an adapter for gas treatment (not shown) to a surface other than both ends of the intermediate tank 11 fixed to the outer wall surfaces of the first pressure vessel 4 and the second pressure vessel 5, or to the lid 12, the internal space can be filled with insulating gas, the intermediate tank 11 has a function as a gas insulating pressure vessel.

FIG. 4 is a cross-sectional view A-A of FIG. 2, which is a cross-sectional view seen from above of the bus bar connecting device. As shown in FIG. 4, when the bushing sets for three phases are parallel in the depth direction of the connection area between the switchgears, the intermediate tank 11 has a structure for storing the bushing sets for the three phases in the connection area in the internal space.

Next, the detailed structure of the intermediate tank 11 will be described with reference to FIGS. 5A, 5B, and 5C. The structure seen from the upper part of the intermediate tank 11 is shown in FIG. 5A. FIG. 5B shows the structure of the first fringe area 11c, which is one end surface of the intermediate tank 11 fixed to the first pressure vessel 4 of the switchgear 2. Further, the cross section B-B in FIG. 5A is shown in FIG. 5C.

As shown in FIGS. 5A and 5B, the both end faces (the first fringe area 11c and the second fringe area 11d) of the intermediate tank 11 has a first opening part 18a and a second opening part 18b provided for the protruding part of the bushings for three phases to pass through. As shown in FIG. 5B, the first fringe area 11c of the intermediate tank 11 surrounding the first opening part 18a has a structure having a plurality of fixture through holes 18c to pass the fixture 8 on the side of the first pressure vessel 4 on the outer circumference of the inner guide 21a for fixing the inner position of the gas sealing material such as packing, the outer guide 21b for fixing the outer position, and the outer guide 21b. The second fringe area 11d of the intermediate tank 11 surrounding the second opening part 18b fixed to the second pressure vessel 5 of the switchgear 3 has the same structure, and it has a plurality of fixture through holes 18d (not shown) for passing the fixture 9 on the second pressure vessel 5 side.

Further, as shown in FIGS. 5A and 5C, the hand hole 19 is provided on the upper surface of the intermediate tank 11. The hand hole 19 is provided not only on the upper surface of the intermediate tank 11 but also on a surface other than both end surfaces having openings. The hand hole 19 has an opening having a size including at least the connecting conductor part 10 in the plane of normal projection so as to perform the connecting work of the connecting conductor part 10. As a result, even after the fringe area of both end faces of the intermediate tank 11 are fixed to the pressure vessel, the operator can perform the connection work from the hand hole 19 using the connecting conductor part 10 in the intermediate tank 11.

Between the outer wall surface 4a of the first pressure vessel 4 and the intermediate tank 11, between the outer wall surface 5a of the second pressure vessel 5 and the intermediate tank 11, and between the lid 12 and the intermediate tank 11 for sealing the hand hole 19, a gas sealing material such as packing is used for fixing and sealing. In other words, since the first opening part 18a, the second opening part 18b, and the hand hole 19 on both end faces of the intermediate tank 11 are sealed, the inside of the intermediate tank 11 is sealed.

Further, as shown in FIGS. 5A and 5C, in the intermediate tank 11, as a space for passing fixtures fixed to the outer wall surface of the first pressure vessel 4 and the second pressure vessel 5, each are provided in an annular shape along the peripheral edges of the first fringe area 11c and the second fringe area 11d, respectively, a first bent part 11a and a second bent part 11b that bend inward toward the bushing are formed.

This is provided with an electric field relieving shield 16 in the bushing, as shown in FIG. 3, due to the electric field relieving effect around the opening on the wall of the pressure vessel, it is possible to provide the first bent part 11a and the second bent part 11b of the intermediate tank 11 close to the bushing. According to the first bent part 11a and the second bent part 11b formed in the intermediate tank 11, since the space for passing the fixture is inside the outer circumference of the intermediate tank 11, it is not necessary to make the outer peripheral size of the fringe area of both end faces of the intermediate tank 11 larger than that of the central part, and the bus bar connecting device can be reduced. With the miniaturization of the bus bar connecting device that uses the intermediate tank of this structure, the range for fixing the stunt to the wall surface of the pressure vessel of the switchgear can also be reduced, the external size of the switchgear can be made compact.

Figure 6:
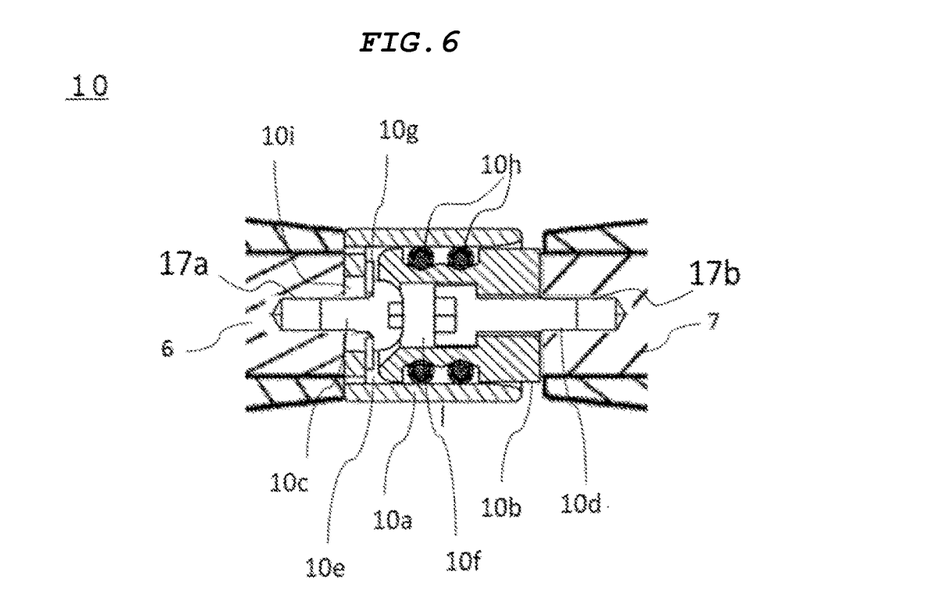
FIG. 6 is an enlarged cross-sectional view of a connecting conductor part of the bus bar connecting device according to the first embodiment of the present application.

Next, the structure of the connecting conductor part 10 composed of the plurality of conductive members shown in FIG. 6 will be described. In FIG. 6, the connecting conductor part 10 has a fitting structure of a cup-shaped socket conductor 10a and a rod-shaped plug conductor 10b. The socket conductor 10a is provided with a cup-shaped hole 10e, and the plug conductor 10b is provided with a cup-shaped hole 10f. The inner diameter of the cup-shaped socket conductor 10a is made to be substantially the same as the outer diameter of the rod-shaped plug conductor 10b. The plug conductor 10b is inserted inside the socket conductor 10a, and is electrically connected by sliding contact via a plurality of contacts 10h attached to the plug conductor 10b.

The first connection part 17a of the first bushing 6 and the socket conductor 10a are connected by a bolt 10c, and the second connection part 17b of the second bushing 7 and the plug conductor 10b are connected by a bolt 10d.

The first bushing 6 and the second bushing 7 are connected so as to face each other so as to be on a coaxial extension line, in the parallel direction or the vertical direction of the connection central axis, a deviation of several millimeters to several tens of millimeters is set as a connectable allowable range. As a result, even if the bushing shift occurs, which is difficult to adjust at the site where the switchgear is carried in, the connection position can be adjusted within the allowable range of the connecting conductor part 10. Here, as a method of dealing with the deviation, for example, the hole diameter of each component of the connecting conductor part 10 may be increased. Specifically, in the connecting conductor part 10, the socket conductor 10a has the socket conductor 10a in order to alleviate the misalignment of the bushings with each other, the hole diameter of the bolt hole 10i is formed to be several millimeters to several tens of millimeters larger than the diameter of the bolt 10c. Further, the socket conductor 10a and the first connection part 17a of the first bushing 6 are connected by the bolt 10c via a washer 10g larger than the hole diameter of the bolt hole 10i.

Figure 7:
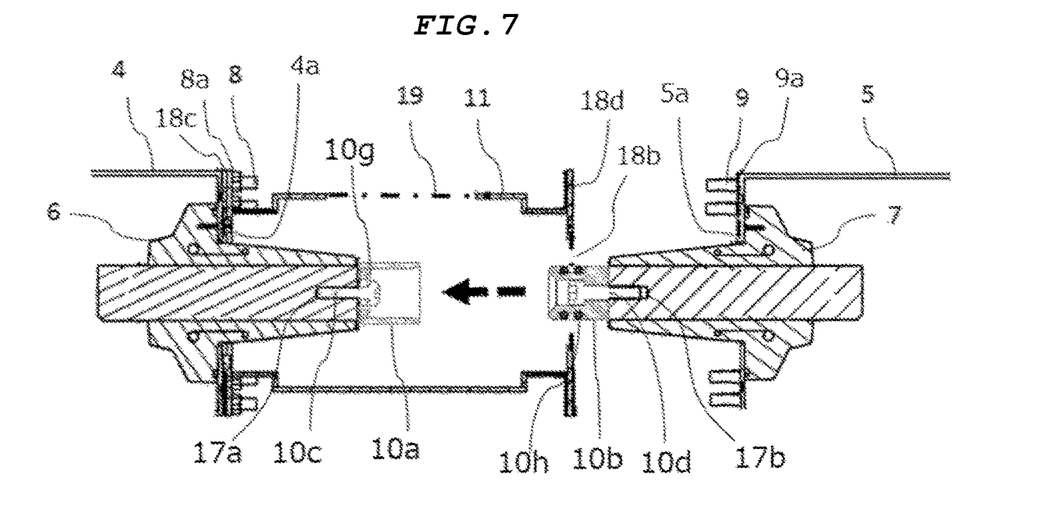
FIG. 7 is a diagram showing a connection intermediate stage of the bus bar connecting device according to the first embodiment of the present application.

Here, the connection method of the bus bar connecting device 1 according to the first embodiment will be described. FIG. 7 is a diagram showing an intermediate stage of the bushing connection of the bus bar connecting device 1. As shown in FIG. 7, the socket conductor 10a is previously connected to the first connection part 17a of the first bushing 6 via a washer 10g using a bolt 10c. The plug conductor 10b provided with the contactor 10h is connected to the second connection part 17b of the second bushing 7 by using a bolt 10d. However, at this stage, the socket conductor 10a and the first bushing 6 are not completely tightened, but are tightened to the extent to be touched and moved.

First, a gas sealing material such as packing is attached to the first pressure vessel 4 in advance at the attachment part of the intermediate tank 11 of the outer wall surface 4a corresponding to the attachment position of the first bushing 6. In the intermediate tank 11, the fixture 8 fixed to the outer wall surface 4a is inserted into the fixture through hole 18c of the intermediate tank 11 and fixed with the fixing nut 8a.

Figure 8:
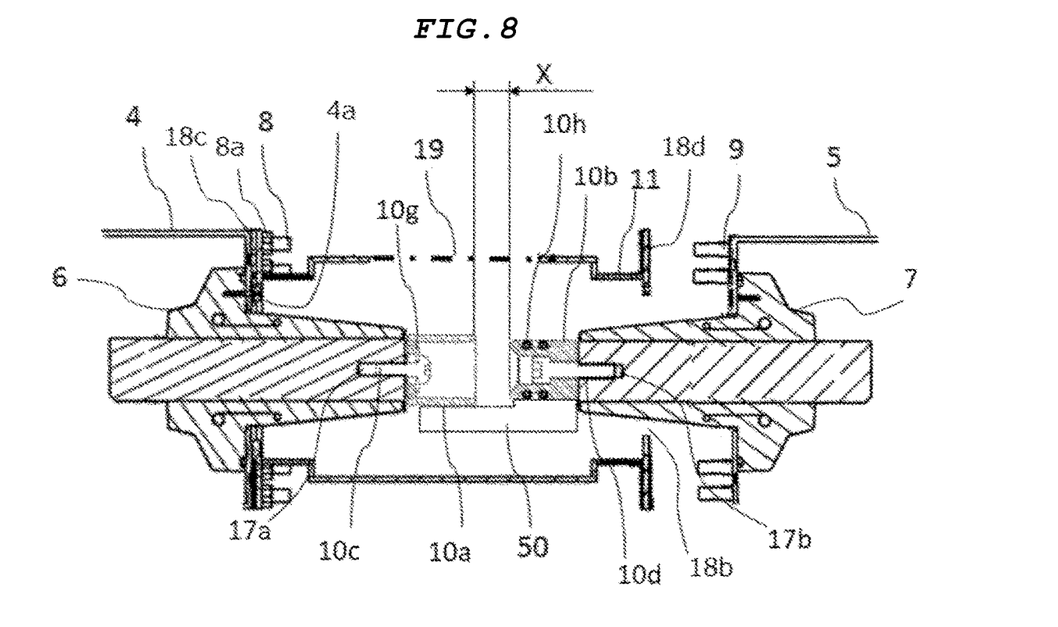
FIG. 8 is a diagram showing that an adjustment jig is used during connection of the bus bar connecting device according to the first embodiment of the present application.

Next, from the state shown in FIG. 7, as shown in FIG. 8, the pressure vessels of the switchgears are brought closer to each other so that the distance between the socket conductor 10a and the plug conductor 10b is further decreased to the shortest distance X of the gap required for tightening the bolt 10c.

At this stage, the fixing positions of the socket conductor 10a and the plug conductor 10b that are close to each other are adjusted by using the adjusting tool 50. When the position adjustment is completed, the bolt 10c is completely tighten. The position adjustment using the adjustment tool 50 and the tightening work of the bolt 10c are performed from the hand hole 19.

Next, the pressure vessels of the switchgears are brought closer to each other again, the plug conductor 10b is fitted inside the socket conductor 10a, and the plug conductor 10b is fitted, the fixture 9 is also completely inserted into the fixture through hole 18d of the intermediate tank 11 on the second pressure vessel 5 side. After that, in the intermediate tank 11, the fixture 9 fixed to the outer wall surface 5a of the second pressure vessel 5 is inserted into the fixture through hole 18d of the intermediate tank 11 and fixed with the fixing nut 9a.

Finally, the hand hole 19 is sealed with a lid 12 via a gas sealing material such as packing, and an insulating gas is sealed.

Figure 9:
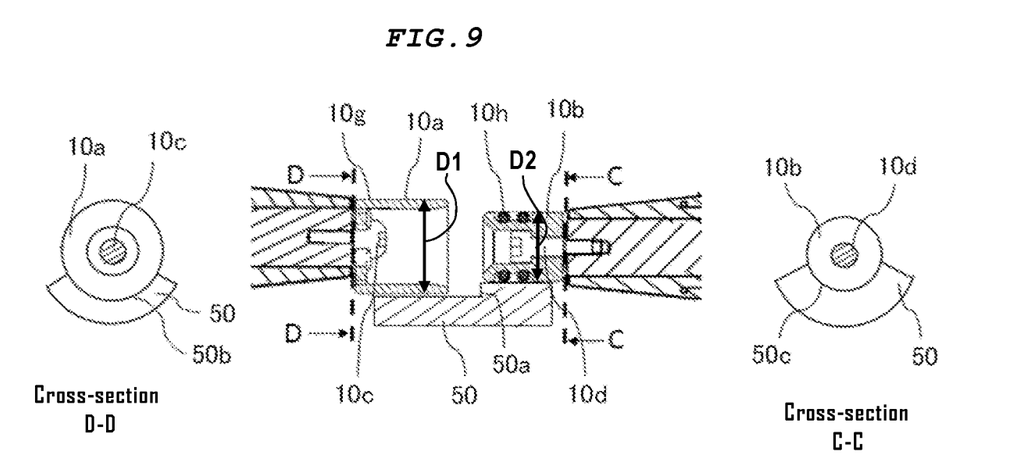
FIG. 9 is a cross-sectional view of an adjusting jig used during the connection of the bus bar connecting device according to the first embodiment of the present application.

Next, the adjusting tool 50 will be described. FIG. 9 shows a state when the adjustment tool 50 is used in the bus bar connecting device according to the first embodiment, and two cross-sectional views of the adjusting tool 50.

The adjusting tool 50 has a step 50a in the cross section of the socket conductor 10a and the plug conductor 10b in the connecting direction. When the outer diameter of the socket conductor 10a is the first outer diameter D1 and the outer diameter of the plug conductor 10b is the second outer diameter D2, the step 50a has a height of (D1−D2)/2.

In the cross section D-D on the socket conductor 10a side, the adjusting tool 50 has a first curved surface 50b that matches the first outer diameter D1 of the socket conductor 10a. At the same time, in the cross section C-C on the plug conductor 10b side, the adjusting tool 50 has a second curved surface 50c that matches the second outer diameter D2 of the plug conductor 10b. Both the first curved surface 50b and the second curved surface 50c have an angle range of 180° or less and have a structure that can be attached and detached.

According to the bus bar connecting device according to the first embodiment, the bus bar connecting device can be easily assembled and the workability of the switchgear line unit can be improved. In addition, the structure of the intermediate tank makes possible the reduction of the size of the bus bar connecting device. Further, with the miniaturization of the bus bar connecting device according to the first embodiment, the external size of the switchgear can be made compact.

Further, according to the method for connecting a bus bar according to the first embodiment, the bus connection work can be performed from the hand hole of the intermediate tank, so that the assembly work is simplified.

Second Embodiment

Figure 10:
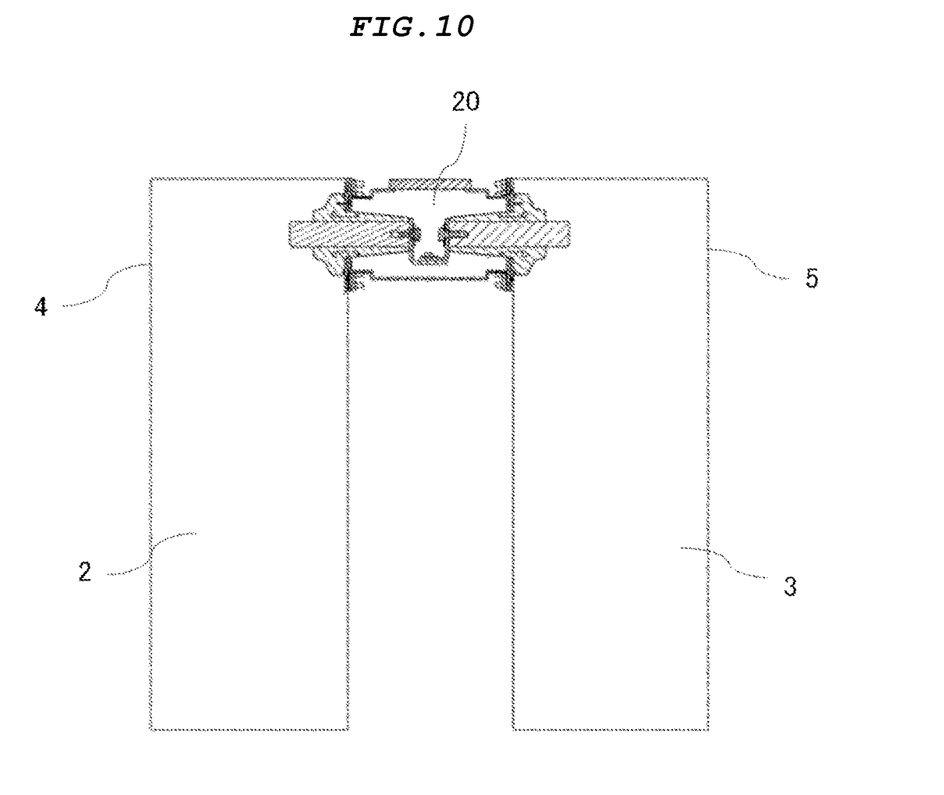
FIG. 10 is a cross-sectional view showing the entire switchgear connected to the bus bar connecting device according to the second embodiment of the present application.

FIG. 10 shows a switchgear connected to a bus bar connecting device according to the second embodiment of the present application. The difference from the first embodiment is the structure of the connecting conductor part 22 of the bus bar connecting device 20 and the method for connecting the bushing.

Figure 11:
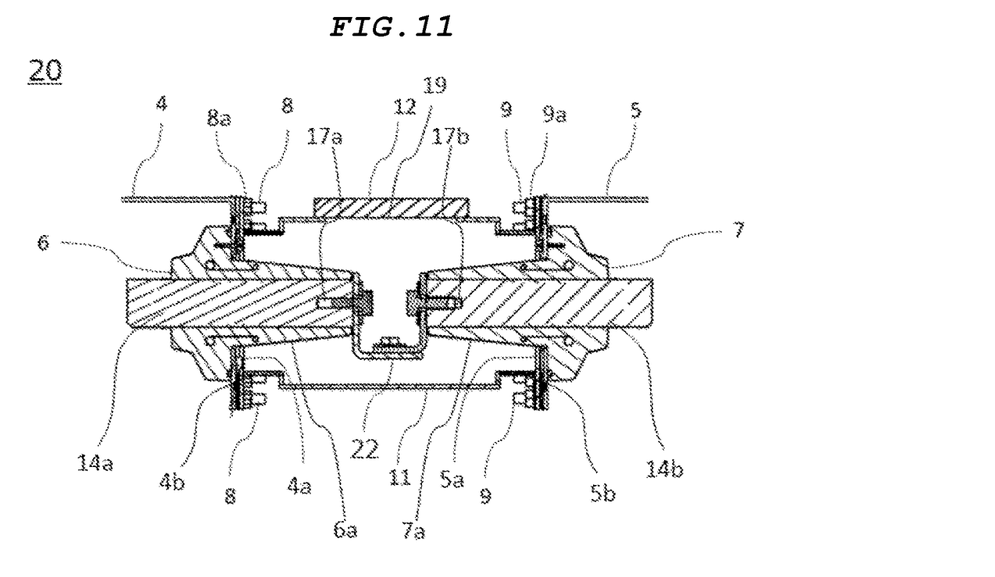
FIG. 11 is an enlarged cross-sectional view of a bus bar connecting device according to a second embodiment of the present application.

FIG. 11 is an enlarged view of a bus bar connecting device according to the second embodiment of the present application. Since the structures of the first bushing 6 and the second bushing 7 are the same as those of the first embodiment, the description thereof will be omitted. The first bushing 6 is attached to the inner wall surface 4b of the first pressure vessel 4 of the switchgear 2, similarly, the second bushing 7 is attached to the inner wall surface 5b of the second pressure vessel 5 of the switchgear 3.

Further, the structure of the intermediate tank 11 for storing the first protruding part 6a of the first bushing 6, the second protruding part 7a of the second bushing 7, and the connecting conductor part 2 is the same as that of the first embodiment.

The second embodiment is not the connecting conductor part 10 having a fitting structure of the cup-shaped socket conductor 10a and the rod-shaped plug conductor 10b as in the first embodiment, the connecting conductor part 22 is composed of a plurality of conductor parts and fixing members.

Figure 12:
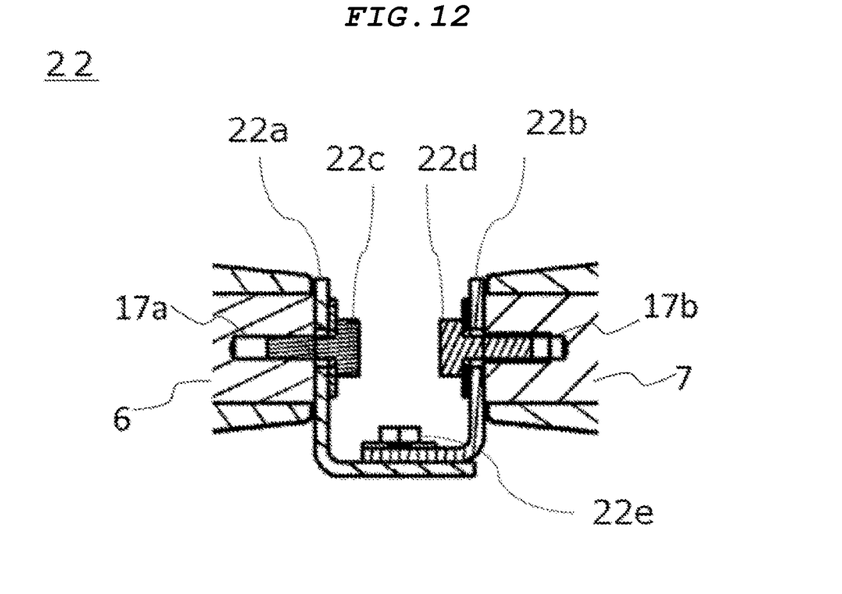
FIG. 12 is an enlarged cross-sectional view of a connecting conductor part of the bus bar connecting device according to the second embodiment of the present application.

FIG. 12 is an enlarged cross-sectional view of the connecting conductor part 22 of the bus bar connecting device 20. In FIG. 12, the connecting conductor part 22 is composed of the first conductor part 22a, which is fixed to the first connection part 17a of the first protruding part 6a of the first bushing 6 by the first fixing member 22c, and the second conductor part 22b fixed to the second connection part 17b of the second protruding part of the second bushing 7 by the second fixing member 22d. Further, the first conductor part 22a and the second conductor part 22b are connected by a third fixing member 22e.

The first fixing member 22c, the second fixing member 22d, and the third fixing member 22e are metallic conductive members, and for example, bolts are used.

The first bushing 6 and the second bushing 7 are connected so as to face each other so as to be on a coaxial extension line, in the parallel direction or the vertical direction of the connection central axis, a deviation of several millimeters to several tens of millimeters is provided as a connectable allowable range. As a result, even if the bushing shift, which is difficult to adjust at the site where the switchgear is carried in, occurs, it can be adjusted by the connecting conductor part 10. Here, the positions can be adjusted within the permissible range of the mounting position of the first fixing member 22c, the second fixing member 22d, and the third fixing member 22e.

Specifically, as a method of dealing with the deviation, increasing the hole diameter of the component of the connecting conductor part 22 or increasing the number of components of the connecting conductor part 22 can be mentioned. For example, by increasing the play of the first conductor part 22a and the second conductor part 22b with respect to the bolt, the structure is such that the first bushing 6 and the second bushing 7 can be connected even if they are misaligned.

Figure 13:
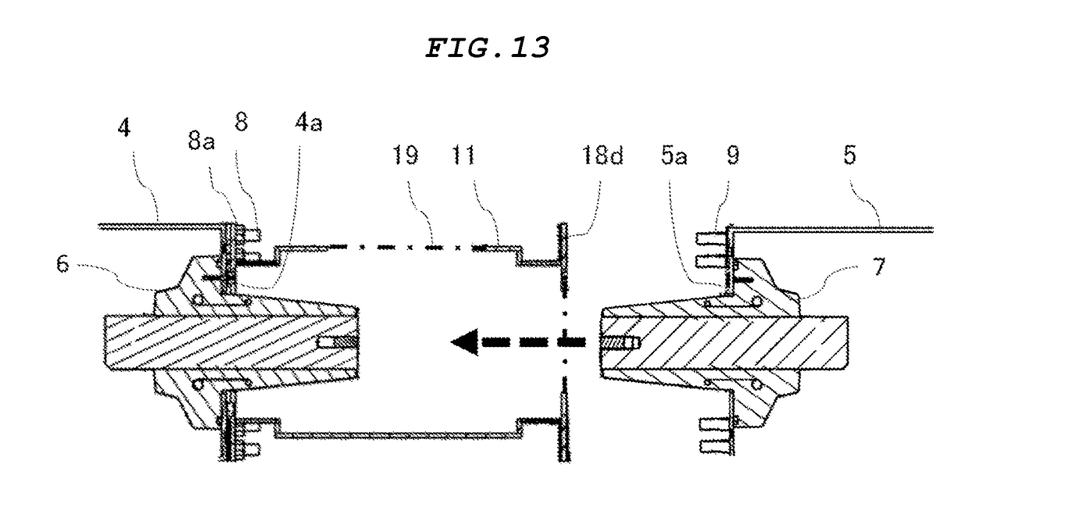
FIG. 13 is a diagram showing a connection intermediate stage of the bus bar connecting device according to the second embodiment of the present application.

Here, the connection method of the bus bar connecting device 20 according to the second embodiment will be described. FIG. 13 is a diagram showing an intermediate stage of the bushing connection of the bus bar connecting device 20. First, a gas sealing material such as packing is attached to the attachment part of the intermediate tank 11 of the outer wall surface 4a corresponding to the bushing attachment position of the first pressure vessel 4 of the switchgear 2. Similarly, a gas sealing material such as packing is attached to the attachment part of the intermediate tank 11 on the outer wall surface 5a corresponding to the bushing attachment position of the second pressure vessel 5 of the switchgear 3.

First, the fixture 8 fixed to the outer wall surface 4a is inserted into the fixture through hole 18c of the intermediate tank 11, and the intermediate tank 11 is fixed by the fixing nut 8a.

Next, the fixture 9 fixed to the outer wall surface 5a corresponding to the bushing attachment position of the second pressure vessel 5 in the switchgear 3 is brought closer so as to be inserted into the fixture through hole 18d of the intermediate tank 11. After the fixture 9 is completely inserted into the fixture through hole 18d, the fixture through hole 18c and the fixture 9 are fixed with the fixing nut 9a. Further, as shown in FIG. 12, from the hand hole 19 of the intermediate tank 11, the first conductor part 22a, the second conductor part 22b, the first fixing member 22c, the second fixing member 22d, and the third fixing member 22e are used, the first connection part 17a of the first bushing 6 and the second connection part 17b of the second bushing 7 arranged so as to face each other are connected. After the connection work is completed, the hand hole 19 is sealed with a lid 12 via a gas sealing material such as packing, and an insulating gas is sealed.

According to the bus bar connecting device according to the second embodiment, the bus bar connecting device can be easily assembled and the workability of the switchgear line unit can be improved. In addition, the structure of the intermediate tank makes possible the reduction of the size of the bus bar connecting device. Further, with the miniaturization of the bus bar connecting device according to the first embodiment, the external size of the switchgear can be made compact.

Further, according to the method for connecting a bus bar according to the second embodiment, the bus connection work can be performed from the hand hole of the intermediate tank, so that the assembly work is simplified. Moreover, since the contact resistance can be minimized by improving the bus connection performance, the main circuit resistance between the switchgears can also be reduced.

Third Embodiment

Figure 14:
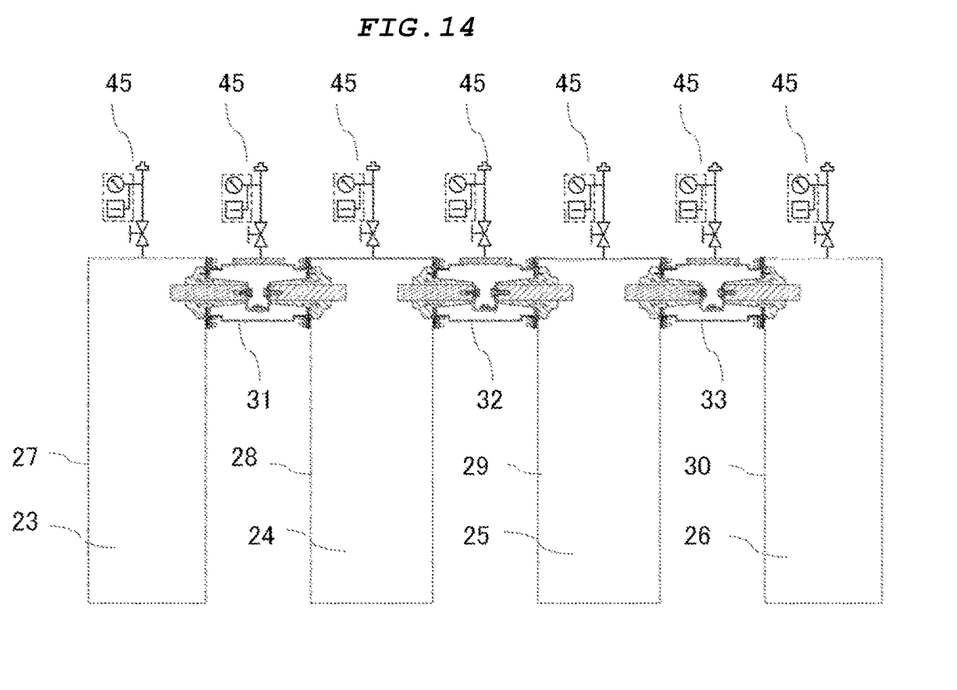
FIG. 14 is a diagram showing a lined switchgear according to the second embodiment of the present application.

In the first and second embodiments, the first pressure vessel 4 of the adjacent switchgear 2, the second pressure vessel 5 of the switchgear 3, and the intermediate tank 11 of the bus bar connecting device are separated closed containers. In other words, these sealed pressure vessels are in a state of being independently partitioned, the number of gas treatments required for the number of pressure vessels is required. For example, as shown in FIG. 14, in the single line unit form of the four switchgears 23 to 26, since there are four pressure vessels 27 to 30 and intermediate tanks 31 to 33 of the bus bar connecting device, a total of seven closed vessels, gas treatment is required seven times, and it is necessary to attach the gas filling device 45 to each of the seven pressure vessels.

Figure 15:
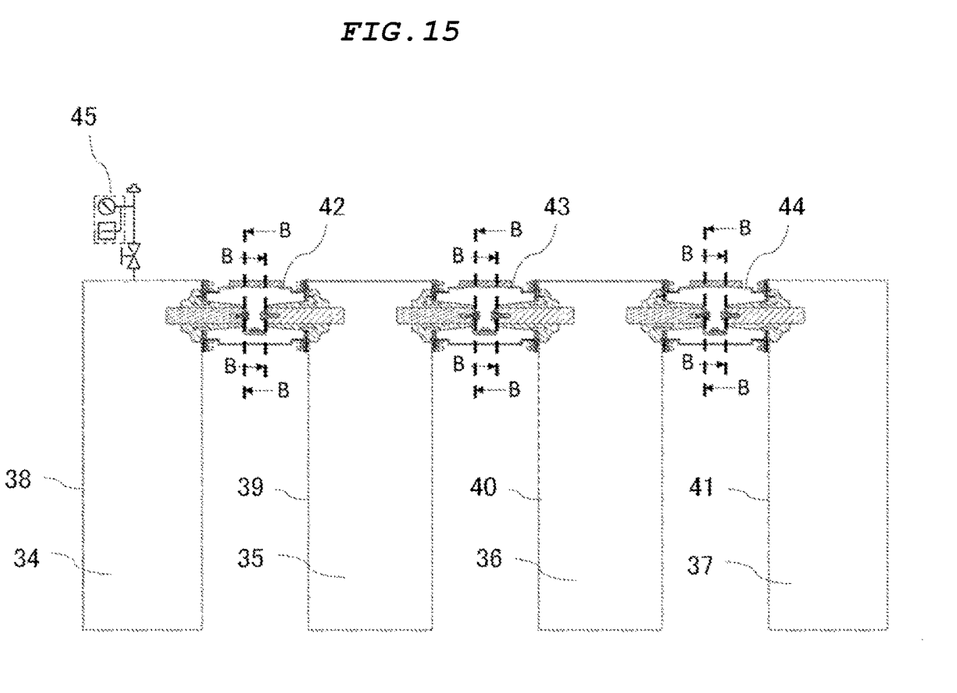
FIG. 15 is a diagram showing a lined switchgear according to the third embodiment of the present application.

For example, in the third embodiment, as shown in FIG. 15, in the single line unit form of the four switchgears 34 to 37, only one gas filling device 45 is mounted in the four pressure vessels 38 to 41 and the intermediate tanks 42 to 44 of the three bus bar connecting devices.

Figure 16:
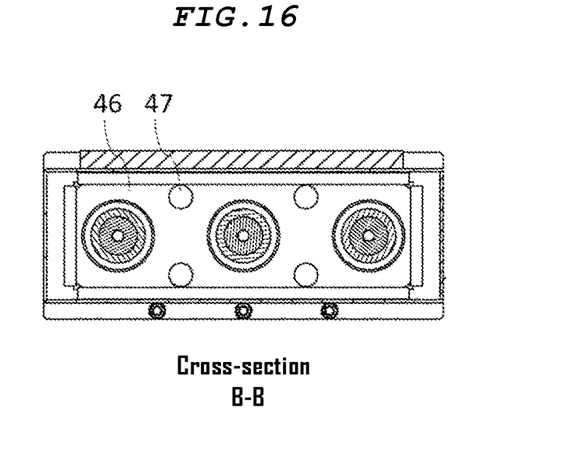
FIG. 16 is a diagram showing a cross section B-B in FIG. 15.

FIG. 16 is a diagram showing a cross section B-B in FIG. 15. As shown in FIG. 16, one or more through holes 47 penetrating the wall surface of the pressure vessel are provided on the wall surface 46 of the pressure vessel covered with the openings of the respective end faces of the intermediate tanks 42 to 44 of the bus bar connecting device. As a result, the four pressure vessels 38 to 41 shown in FIG. 15 and the intermediate tanks 42 to 44 of the three bus bar connecting devices are set as the same gas compartment. Therefore, even in the form in which a plurality of switchgears is lined up, gas treatment can be performed at one time by attaching the gas filling device 45 to either the pressure vessel or the intermediate tank. Further, not all the pressure vessels and the intermediate tank are in the same gas compartment, but only some pressure vessels that are required to be in the same gas compartment may be provided with through holes on the wall surface.

The bus bar connecting device shown in FIG. 15 has the structure of the connecting conductor part 22 of the second embodiment. Similarly, in the connecting conductor part 10 as in the first embodiment, it is possible to realize that a plurality of pressure vessels and an intermediate tank are partitioned by the same gas.

According to the bus bar connecting device and the method connecting a bus according to the third embodiment, it has the same effect as that of the first and second embodiments, and further, according to the switchgear according to the third embodiment, since the wall surface of the pressure vessel of the switchgear is provided with a through hole that penetrates the intermediate tank, the gas treatment of the pressure vessel and the intermediate tank, which are required to be in the same gas compartment, can be performed at once. As a result, the number of gas treatments in the pressure vessel of the switchgear and the intermediate tank of the bus bar connecting device can be reduced, the switchgear assembly work becomes easier.

REFERENCE SIGNS LIST 1, 20. Bus bar connecting device,
2. Switchgear,
3. Switchgear,
4. First pressure vessel,
4a. Outer wall surface of the first pressure vessel,
4b. Inner wall surface of the first pressure vessel,
5. Second pressure vessel,
5a. Outer wall surface of the second pressure vessel,
5b. Inner wall surface of the second pressure vessel,
6. First bushing,
6a. First protruding part,
7. Second bushing,
6a. Second protruding part,
8, 9. Fixture,
8a, 9a. Nut
10, 22. Conductor connecting member,
10a. Socket conductor,
10b. Plug conductor,
10c, 10d. Bolt,
10e. Cup-shaped hole,
10f. Cup-shaped hole,
10g. Washer,
10h. Contact maker;
10i. Bolt hole,
22a. First conductor part,
22b. Second conductor part,
22c. First fixing member,
22d. Second fixing member,
22e. Third fixing member,
11. Intermediate tank,
11a. First bend part,
11b. Second bend part,
11c. First fringe part,
11d. Second fringe part,
12. Lid,
13. Bushing attachment surface,
14a. First internal through conductor,
14b. Second internal through conductor,
15. Bushing insulating layer,
16. Electric field moderating shield,
17a. First connection part,
17b. Second connection part,
18a. First opening part,
18b. Second opening part,
18c, 18d. Hole fixture,
19. Hand hole,
21a. Inner guide,
21b. Outer guide,
23, 24, 25, 26, 34, 35, 36, 37. Switchgear,
27, 28, 29, 30, 38, 39, 40, 41. Pressure vessel,
31, 32, 33, 42, 43, 44. Intermediate tank of the bus bar connecting device,
45. Gas filling device,
46. Wall surface,
47. Through hole,
50. Adjusting tool,
50a. Level difference
50b. First curved surface,
50c. Second curved surface,

The invention claimed is:

1. A bus bar connecting device, comprising:
a first bushing fixed to an inner wall surface of a first pressure vessel and penetrated therethrough by a first internal through conductor, comprising;
a first protruding part projecting to the outside of the first pressure vessel, and
a first connection part exposed from the first protruding part,
a second bushing fixed to an inner wall surface of a second pressure vessel penetrated therethrough by a second internal through conductor, the second pressure vessel adjacent to the first pressure vessel, comprising;
a second protruding part projecting to the outside of the second pressure vessel, and
a second connection part exposed from the second protruding part,
a connecting conductor part made of a conductive member that electrically connects the first connection part and the second connection part and provided between the first bushing and the second bushing, and
an intermediate tank having an internal space storing the first protruding part, the second protruding part, and the connecting conductor part so as to seal the first protruding part, the second protruding part, and the connecting conductor part, the intermediate tank comprises:
a hand hole having an opening sized to include a vertical projection of the connecting conductor part,
a lid for sealing the hand hole,
a first opening,
a second opening,
a first fringe area surrounding the first opening and fixed to an outer wall surface of the first pressure vessel, and
a second fringe area surrounding the second opening is fixed to an outer wall surface of the second pressure vessel,
a first bent part provided in an annular shape along a peripheral edge of the first fringe area and bends inward toward the first bushing as a space for passing first fixtures for fixing the intermediate tank to the outer surface of the first pressure vessel, and a second bent part provided in an annular shape along a peripheral edge of the second fringe area and bends inward toward the second bushing as a space for passing the fixtures for fixing the intermediate tank to the outer surface of the second pressure vessel.

2. The bus bar connecting device according to claim 1, wherein;
a plurality of bushing sets each of which includes the first bushing and the second bushing connected each other by the connecting conductor part, and
the intermediate tank stores the plurality of the bushing sets in the internal space of the intermediate tank.

3. The bus bar connecting device according to claim 2, wherein;
a plurality of hand holes including the hand hole, each of the hand holes is provided to be arranged corresponding to a respective one of the connecting conductor part.

4. The bus bar connecting device according to claim 3, wherein;
the connecting conductor part is composed of mating and connecting a cup-shaped socket conductor fixed to the first connection part and a rod-shaped plug conductor fixed to the second connection part and fitted in the cup-shaped socket conductor.

5. The bus bar connecting device according to claim 3, wherein;
the connecting conductor part has a first conductor part fixed to the first connection part by a first fixing member and a second conductor part fixed to the second connection part by a second fixing member,
the first conductor part and the second conductor part are connected by a third fixing member, and
a position of the connecting conductor part configured to be adjusted within an allowable range of mounting positions of the first fixing member, the second fixing member, and the third fixing member.

6. The bus bar connecting device according to claim 2, wherein;
the connecting conductor part is composed of mating and connecting a cup-shaped socket conductor fixed to the first connection part and a rod-shaped plug conductor fixed to the second connection part and fitted in the cup-shaped socket conductor.

7. The bus bar connecting device according to claim 2, wherein;
the connecting conductor part has a first conductor part fixed to the first connection part by a first fixing member and a second conductor part fixed to the second connection part by a second fixing member,
the first conductor part and the second conductor part are connected by a third fixing member, and
a position of the connecting conductor part configured to be adjusted within an allowable range of mounting positions of the first fixing member, the second fixing member, and the third fixing member.

8. The bus bar connecting device according to claim 1, wherein;
the connecting conductor part is composed of mating and connecting a cup-shaped socket conductor fixed to the first connection part and a rod-shaped plug conductor fixed to the second connection part and fitted in the cup-shaped socket conductor.

9. The bus bar connecting device according to claim 1, wherein;
the connecting conductor part has a first conductor part fixed to the first connection part by a first fixing member and a second conductor part fixed to the second connection part by a second fixing member,
the first conductor part and the second conductor part are connected by a third fixing member, and a position of the connecting conductor part configured to be adjusted within an allowable range of mounting positions of the first fixing member, the second fixing member, and the third fixing member.

10. A switchgear, wherein;
a connection area is formed between first and second adjacent pressure vessels,
the bus bar connecting device according to claim 1 is arranged in the connection area, and
the first and second adjacent pressure vessels are connected to each other.

11. The switchgear according to claim 10, wherein;
a through hole penetrating through a wall surface of each of the first and second adjacent pressure vessel is covered by the openings of the intermediate tank of the bus bar connecting device, and
the intermediate tank and the first and second adjacent pressure vessels are in a same gas compartment.

12. A switchgear, wherein;
a connection area is formed between first and second adjacent pressure vessels,
the bus bar connecting device according to claim 2 is arranged in the connection area, and
the first and second adjacent pressure vessels are connected to each other.

13. A switchgear, wherein;
a connection area is formed between first and second adjacent pressure vessels,
the bus bar connecting device according to claim 3 is arranged in the connection area, and
the first and second adjacent pressure vessels are connected to each other.

14. A switchgear, wherein;
a connection area is formed between first and second adjacent pressure vessels,
the bus bar connecting device according to claim 4 is arranged in the connection area, and
the first and second adjacent pressure vessels are connected to each other.

15. A switchgear, wherein;
a connection area is formed between first and second adjacent pressure vessels,
the bus bar connecting device according to claim 5 is arranged in the connection area, and
the first and second adjacent pressure vessels are connected to each other.

16. A switchgear, wherein;
a connection area is formed between first and second adjacent pressure vessels,
the bus bar connecting device according to claim 6 is arranged in the connection area, and
the first and second adjacent pressure vessels are connected to each other.

17. A switchgear, wherein;
a connection area is formed between first and second adjacent pressure vessels,
the bus bar connecting device according to claim 7 is arranged in the connection area, and
the first and second adjacent pressure vessels are connected to each other.

18. A switchgear, wherein;
a connection area is formed between first and second adjacent pressure vessels, the bus bar connecting device according to claim 8 is arranged in the connection area, and the first and second adjacent pressure vessels are connected to each other.

19. A switchgear, wherein;

a connection area is formed between first and second adjacent pressure vessels, the bus bar connecting device according to claim 9 is arranged in the connection area, and the first and second adjacent pressure vessels are connected to each other.

20. A method for connecting a bus bar connecting device, comprising;

projecting another end of a first bushing from a bushing opening of a first pressure vessel to an outside where one end of the first bushing is fixed to an inner wall surface of the first pressure vessel, projecting another end of a bushing opening of a second pressure vessel to the outside where one end of the second bushing is fixed to an inner wall surface of the second pressure vessel, the second pressure vessel adjacent to the first pressure vessel to face the first bushing, fixing a second outer edge part of an intermediate tank to an outer wall surface of the second pressure vessel corresponding to a mounting position of the second bushing where a first outer edge part of the intermediate tank is fixed to an outer wall surface of the first pressure vessel corresponding to a mounting position of the first bushing, connecting a connecting conductor part between the first bushing and the second bushing from a hand hole provided in the intermediate tank, the connecting the connecting conductor part between the first bushing and the second bushing comprises;

fixing a cup-shaped socket conductor having a first outer diameter to a first connection part of the first bushing, fixing a rod-shaped plug conductor having a second outer diameter to a second connection part of the second bushing, adjusting fixed positions of the cup-shaped socket conductor and the rod-shaped plug conductor using an adjusting tool having a first curved surface matched to the first outer diameter and a second curved surface matched to the second outer diameter, and electrically connecting the first connection part and the second connection part where the rod-shaped plug conductor is fitted inside the cup-shaped socket conductor, and after the connecting the connecting conductor part between the first bushing and the second bushing is completed, sealing the hand hole with a lid and then filling an insulating gas in an internal space of the intermediate tank.

\* \* \* \* \*